United States Patent
Thornton et al.

(10) Patent No.: US 6,624,379 B1
(45) Date of Patent: Sep. 23, 2003

(54) METHOD AND APPARATUS FOR WELDING A METAL FASTENER TO A METAL MEMBER

(75) Inventors: Robert T. Thornton, Clarkston, MI (US); Jerry D. Ramsden, Livonia, MI (US); Joseph Nida, Jr., Sterling Heights, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/122,813

(22) Filed: Apr. 15, 2002

(51) Int. Cl.[7] ............................................... B23K 11/14
(52) U.S. Cl. ......................................... 219/93; 219/110
(58) Field of Search ........................ 219/93, 110, 86.41

(56) References Cited

U.S. PATENT DOCUMENTS

| 5,632,912 A | 5/1997 | Cecil |
| 5,808,266 A | 9/1998 | Cecil |
| 6,011,234 A | 1/2000 | Kirchner et al. |
| 6,054,668 A | 4/2000 | Van Otteren et al. |
| 6,163,004 A | 12/2000 | Aoyama et al. |

FOREIGN PATENT DOCUMENTS

JP 9-295162 * 11/1997

* cited by examiner

Primary Examiner—Tom Dunn
Assistant Examiner—Len Tran
(74) Attorney, Agent, or Firm—Kathryn A. Marra (57) ABSTRACT

A method and apparatus for projection welding a metal fastener (e.g., a nut) to a metal member (e.g., a sheet) is disclosed. The apparatus includes a first electrical contact and a locator assembly having a second electrical contact. For welding the fastener to the member, the locator assembly aligns through-holes of the fastener and sheet and a current is passed through protrusions of the fastener. In turn, the protrusions are softened to bond with the member.

20 Claims, 6 Drawing Sheets

METHOD AND APPARATUS FOR WELDING A METAL FASTENER TO A METAL MEMBER

FIELD OF THE INVENTION

The present invention relates to a method and apparatus for welding a fastener to a metal member for assembling automotive vehicle structures.

BACKGROUND OF THE INVENTION

It is known that the manufacture of automotive vehicles often requires that a metal fastener be attached to a metal member to form an automotive vehicle structure. As an example, it is often desirable that a metal nut with a substantially cylindrical through-hole be welded to a metal sheet with a corresponding through-hole such that the through-holes of the nut and sheet are coaxially aligned. Such an arrangement allows a bolt or other fastener to extend at least partially through the through-holes of both the nut and the sheet.

Projection welding is one potential method of attaching a fastener to a member. Projection welding typically requires the metal fastener to include one or more protrusions, which are contacted with the metal member. Thereafter, electrodes pass a current through the member, the fastener and the protrusions to heat and soften the protrusions. In turn, the protrusions bond to the member for welding the fastener to the member.

Conventional projection welding processes, however, present several drawbacks. For example, several different tools may be required to position the fastener and member relative to the electrodes, depending upon the sizes and configurations of the fastener, the member or both. Weld consistency and strength may be less than optimal if the various tools are not properly used for welding fasteners and members of corresponding size. Moreover, conventional processes may not provide any automatic assurances that the fastener is welded to the member. Additionally, electrodes and other tools used for welding the fastener to the member may be rapidly worn or damaged. Thus, there is a need for improved projection welding techniques, instruments or both, for overcoming one or more of the above drawbacks and for achieving high integrity attachment of metal fasteners to metal members.

SUMMARY OF THE INVENTION

The present invention meets these needs by providing an improved apparatus and method of projection welding a metal fastener to a metal member, with particular utility in the formation of components for an automotive vehicle. The apparatus includes a first electrical contact with a cavity defined therein for correspondingly (e.g., matingly) fitting about at least a partial outer perimeter of the fastener, the cavity being at least partially defined by an inner annular surface of the first contact. The apparatus also includes an outer annular housing having a forward end portion, a rearward end portion, and a central portion defining an internal opening extending internally along a length of the housing. The forward end portion supports a second electrical contact. The internal opening includes a first chamber adjacent the forward portion and a second chamber adjacent the rearward portion and an elongated tunnel intermediate the first and second chambers. Additionally, the forward end portion and the second contact cooperatively define a through-hole of the opening.

The apparatus further includes a piston assembly including a piston and pin disposed within the opening of the housing. The piston includes a first forward end adjacent the forward end portion of the housing and a second rearward end adjacent the rearward end portion of the housing. The pin includes an inner cylindrical steel core surrounded by an annular insulator. The insulator is formed of a ceramic material and the insulator is thinner about the core at a free end of the pin for forming a shoulder thereon. Preferably, the apparatus includes at least one pressurized fluid source in fluid communication with the first and second chambers for translating the pin and piston assembly between an extended position, an intermediate position and a retracted position. It is also preferable for the apparatus to include a first sensor adjacent to the first chamber and a second sensor adjacent to the second chamber, wherein the first and second switches monitor whether the pin and piston assembly are in the extended position, the intermediate position or the retracted position.

In operation, an electrical energy source is electrically connected to the first electrical contact and the second electrical contact for passing a current between the contacts and through a plurality of protrusions of the fastener. Moreover, a control unit is in communication with the sensores, the electrical energy source and the fluid source for determining whether the pin and piston assembly have been successfully moved to the intermediate position for welding and for determining whether the pin and piston assembly have been successfully moved to the retracted position for removal of the fastener and member.

The method of projection welding a metal fastener to a metal member, begins by providing a projection welding apparatus having a first electrical contact and a locator assembly including a piston assembly, at least one sensor and a copper housing, wherein the housing substantially surrounds the piston assembly and supports a second electrical contact. A member is then positioned upon the locator assembly wherein a first surface of the member abuttingly contacts the second electrical contact and a pin of the piston assembly extends through a through-hole in the member. A fastener is positioned upon a pin of the piston assembly such that the fastener is spaced away from the member. The fastener is contacted the with the first electrical contact, which urges the fastener toward the member such that the piston assembly moves from the extended position to an intermediate position and such that a plurality of protrusions of the fastener contact a second surface of the member. The fastener is then welded to the member by passing a current between the electrical contacts and through the protrusions of the fastener if the at least one sensor senses that the piston assembly has been successfully moved to the intermediate position. Thereafter, the first electrical contact is retracted and the piston assembly is moved to a retracted position and removal of the member and fastener is signaled if the at least one sensor senses that the piston assembly remains in the intermediate position after retraction of the first electrical contact.

The present invention thus provides an improved projection welding apparatus and projection welding technique for consistently attaching metal fasteners to metal members with high structural integrity welds.

BRIEF DESCRIPTION OF THE DRAWINGS

These and other aspects and advantages of the present invention will become apparent upon reading the following detailed description in combination with the accompanying drawings, in which.

DETAILED DESCRIPTION OF THE PREFERRED EMBODIMENT

Figure 1:
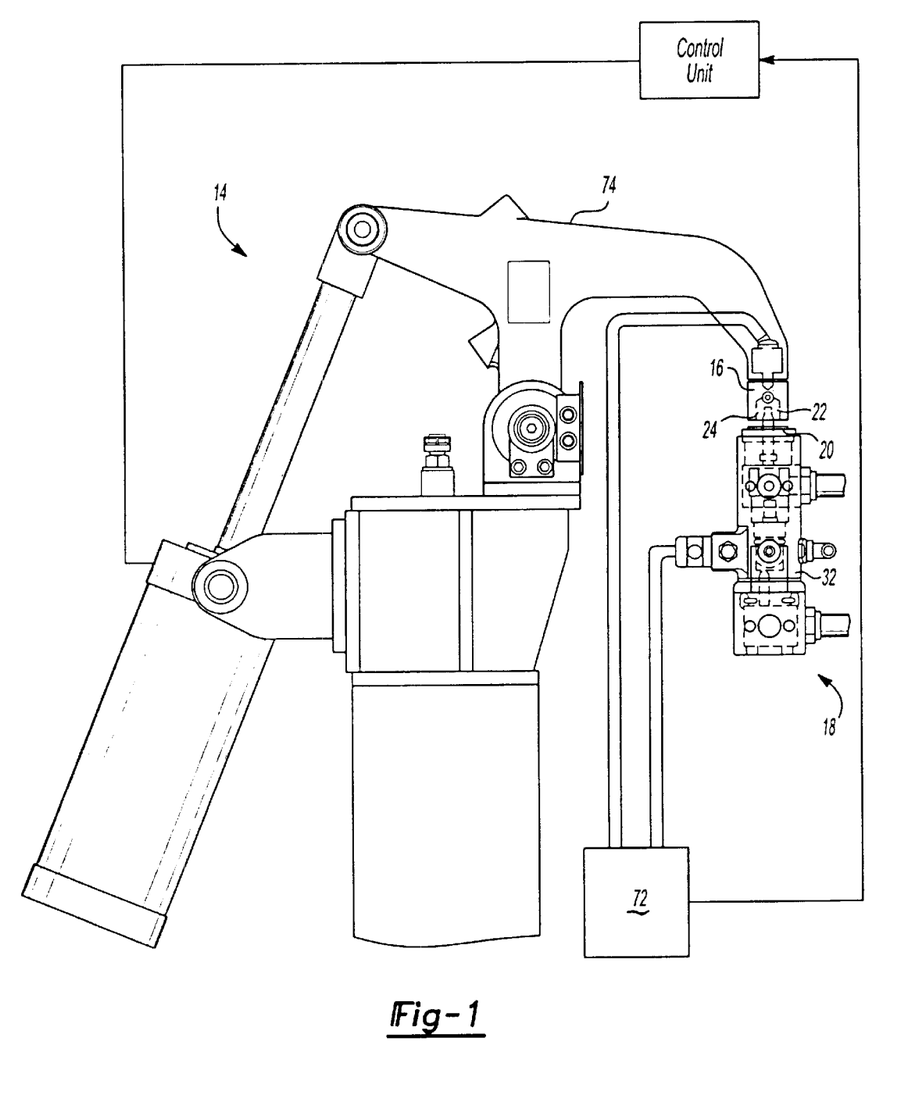
FIG. 1 illustrates a projection welding apparatus for welding a metal fastener to a metal member.
Figure 2:
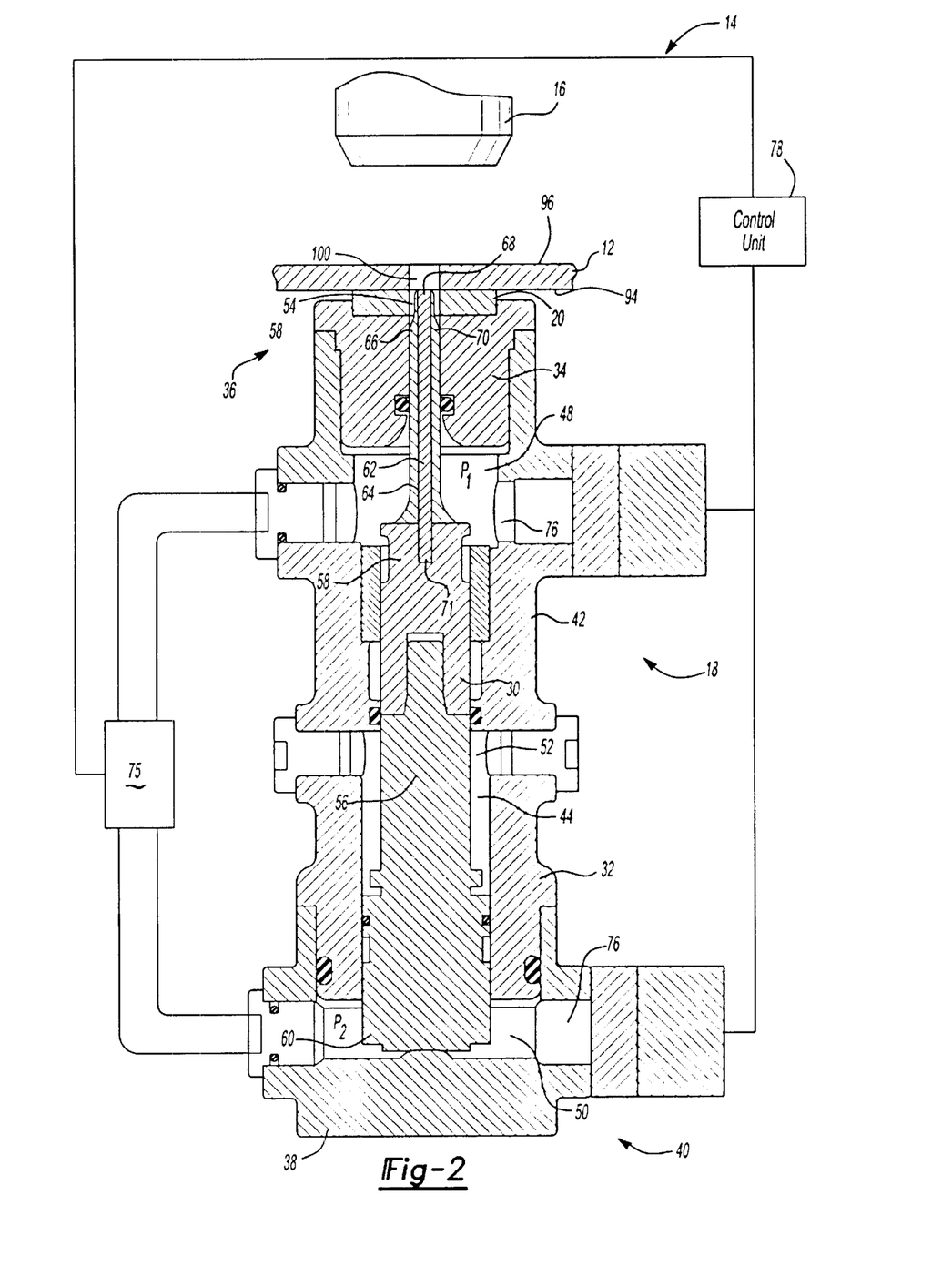
FIG. 2 illustrates a sectional view of a portion of the apparatus of FIG. 1 prior to welding a fastener to a member.
Figure 3:
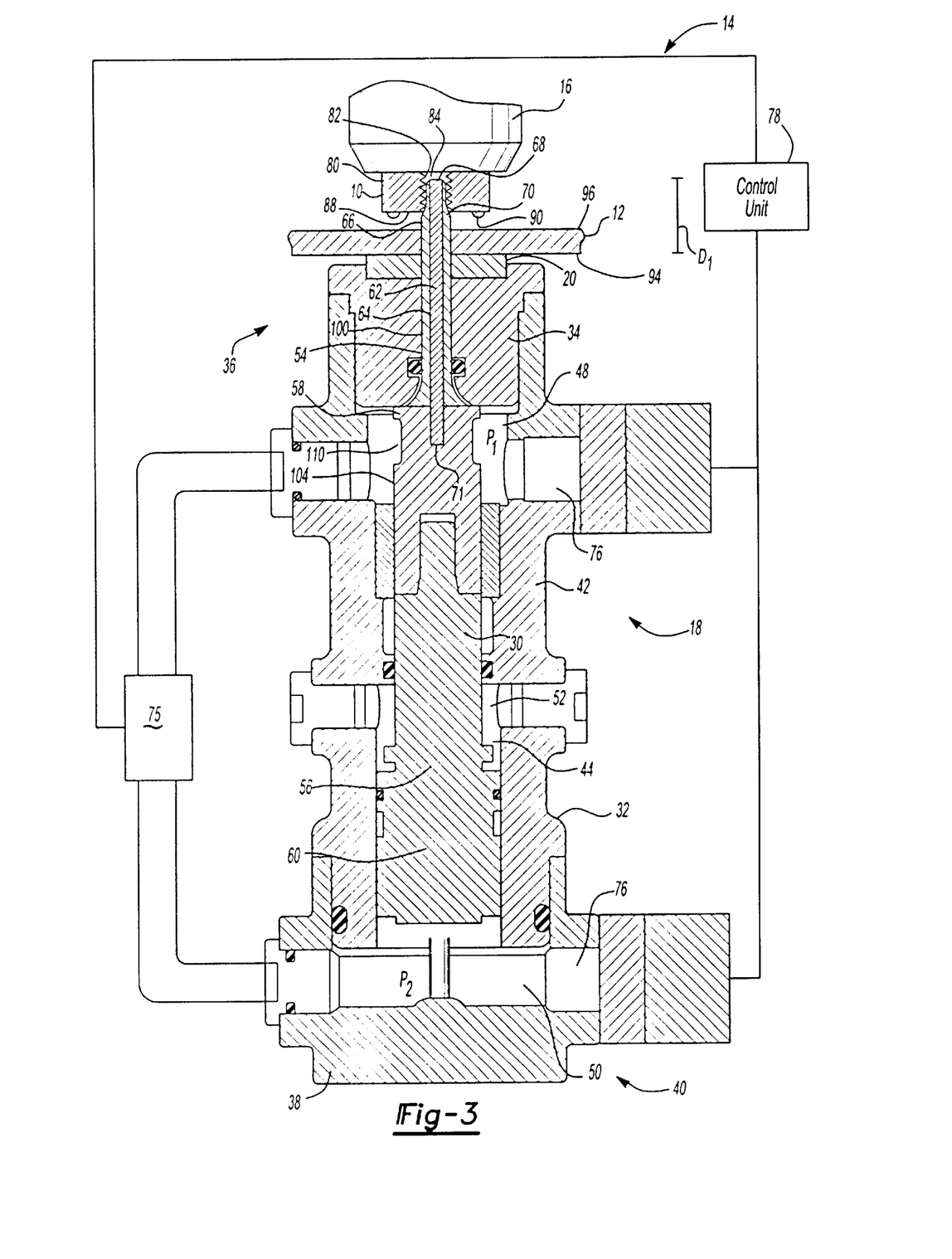
FIG. 3 illustrates a sectional view of the portion of the apparatus depicted in FIG. 2 prior to welding a fastener to a member.

Referring to FIGS. 1–6, a fastener (shown herein as a metal nut 10) is welded to a metal member (shown herein as a sheet 12) by a projection welding apparatus 14. As best seen in FIG. 3, the welding apparatus 14 includes a first electrical contact 16 for contacting the nut 10 and a locator assembly 18. The locator assembly 18 includes a second electrical contact 20 for contacting the sheet 14 and preferably assists in positioning the nut 10 relative to the sheet 12.

As shown in FIG. 1, the first electrical contact 16 is a copper alloy electrode, which includes a central cavity 22 that is at least partially defined by an inner wall (e.g., annular surface 24). As specifically illustrated, the inner wall surface 24 defines the central cavity 22 as generally cylindrical in shape, but the surface 24 may also be partially or fully tapered as to form some or all of the cavity 22 in a conical shape, or otherwise suitably configured. Preferably, the inner surface 24 of the contact 16 is formed of or otherwise includes a class 11 copper or copper alloy (such as ELKO-NITE® commercially available from Contacts Metal Welding, Inc., Indianapolis, Ind.).

Referring to FIGS. 2–6, the locator assembly 18 of the apparatus 14 includes a generally centrally located piston assembly 30 within a metal (e.g., a copper or copper alloy) housing 32. The housing 32 includes a forward generally cylindrical portion 34 at one end 36, a rearward generally cylindrical portion 38 at an opposite end 40 and a central annular portion 42 therebetween. The forward cylindrical portion 34 supports the second electrical contact 20, which, as shown, is an disk, sheet or annular wafer formed of a conductive metal, such as a class 11 copper or copper alloy (such as ELKONITE® commercially available from Contacts Metal Welding, Inc., Indianapolis, Ind.). Preferably, the forward cylindrical portion 34 is threadably attached to the central portion 42 of the housing 32 toward an end thereof (e.g., at end portion 36).

Defined within the housing 32 is a centrally located internal opening 44 extending along a length of the housing 32. The opening 44 includes a first chamber 48 adjacent the forward portion 34 of the housing 32, a second chamber 50 adjacent the rearward portion 38 and an elongated tunnel 52 intermediate the chambers 48, 50. Moreover, the opening 44 includes a through-hole 54 that is cooperatively defined by and extends through the forward end portion 34 of the housing 32 and the second electrical contact 20.

The piston assembly 30 is located within and is moveable along the opening 44. The piston assembly 30 includes an elongated generally cylindrical piston 56 with a first forward end 58 adjacent the forward end portion 34 of the housing 32 and a second rearward end 60 adjacent the rearward end portion 38 of the housing 32. Additionally, the piston assembly 30 includes a pin 62 with an inner cylindrical steel core 64 at least partially surrounded by an annular insulator 66. The insulator 66 is preferably formed of a suitable ceramic material such as sintered silicon nitride ($SiN_2$). Preferably, the insulator 66 is thinner about the core 64 at a free end 68 of the pin 62 for forming a shoulder 70 thereon. It is also preferred that the pin 62 be removably attached to the piston 56 with a threaded protrusion 71 (threads not shown) that can be threadably fastened within a correspondingly threaded cavity in forward end 58 of the piston 56 for anchoring it in place.

Referring to FIG. 1, each of the electrical contacts 16, 20 is electrically connected to an electrical power source 72 (e.g. one including a transformer), which can induce an electrical potential between the contacts 16, 20. Preferably, at least a portion of the housing 32 is electrically conductive (e.g., made of copper, a copper alloy or another metal) such that the housing 32 may optionally assist in electrically connecting the electrical contact 20 of the locator assembly 18 with the electrical power source 72.

It is also preferred for the first electrical contact 16 to be mounted to an apparatus (e.g., a pneumatic actuator, a hydraulic actuator, a robot, a C-frame, hard tooling such as a die set or the like) for moving the contact 16 relative to the locator assembly 18. In the exemplary embodiment of FIG. 1, the contact 16 is attached to a pneumatic actuator 74 that can move the contact 16 as needed or desired and the locator assembly 18 is positioned adjacent the actuator 74.

Referring to FIGS. 1–6, each of the chambers 48, 50 of the locator assembly 18 is in fluid communication with one or more fluid pressure sources or supplies 75. As shown, the locator assembly 18 may include various seals to assist in controlling or restricting fluid flow to and from the chambers 48, 50. Additionally, a pair of sensors 76 (e.g., proximity switches) is attached to the housing 32 for sensing the position of the piston 56 within the chambers 48, 50. Preferably, the electrical contacts 16, 20 (e.g. through the power source 72), the sensors 76 and the fluid pressure supply 75 are in signaling communication with a control unit 78, which may include a suitable programmable logic controller (PLC), a weld controller or the like.

As seen for instance in FIGS. 3–6, Preferably, the nut 10 being welded to the sheet 12 is generally cylindrical with an outer smooth annular surface 80 and an inner threaded annular surface 82. The inner annular surface 82 substantially defines a central through-hole 84 extending through the nut 10. The nut 10 also includes a top annular surface 86 and bottom annular surface 88. One or a plurality (e.g., 2, 3, 4, 5, 6 or more) of protrusions 90 (e.g., substantially hemispherical protrusions) extend outwardly from the bottom annular surface 88 of the nut 10. The protrusions 90 are preferably of the same material as the nut 10, such that they can be integrally formed on the nut. Alternatively, they may be a different material compatible for joining the nut 10 and the sheet 12. The protrusions 90 thus serve as a high surface area to unit volume mass of material for rapid heating or melting for assisting in weld and joint formation. The sheet 12 is generally planar and includes a first surface 94, a second surface 96 and a through-hole 100 extending through the sheet 12 and the surfaces 94, 96.

In operation, the piston assembly 30 (i.e., the pin 62 and the piston 56) of the locator assembly 18 is initially in a first retracted position, as shown in FIG. 2. While in the retracted position, the sheet 12 is placed on the locator assembly 18 to abuttingly contact the first surface 94 of the sheet 12 with the electrical contact 20. Preferably, the through-hole 100 of the sheet 12 is at least generally located above the pin 62.

Once the sheet 12 is in place, the piston assembly 30 is moved (e.g., actuated) to an second extended position as shown in FIG. 3. While the piston assembly 30 is in the extended position, the pin 62 matingly extends through the through-hole 100 of the sheet 12. Preferably, the piston assembly 30 is moved and maintained in the extended position by supplying a fluid pressure $P_2$ from the fluid supply 75 to the second chamber 50 of the housing 32 that is greater than fluid pressure $P_1$ in the first chamber 48. In the extended position, the pin 62 extends outwardly a first distance $D_1$ from the electrical contact 20. Preferably, the electrical contact 20 and the insulator 66 of the pin 62 are the only portions of the locator assembly 18 to contact the sheet 12.

While the piston assembly remains in the extended position, the nut 10 is loaded to the locator assembly 18 by matingly fitting the free end 68 of the pin 62 into the through-hole 84 of the nut 10 such that the nut 10 is supported by the shoulder 70 of the pin 62 and is spaced away from the second surface 96 of the sheet 12.

Figure 4:
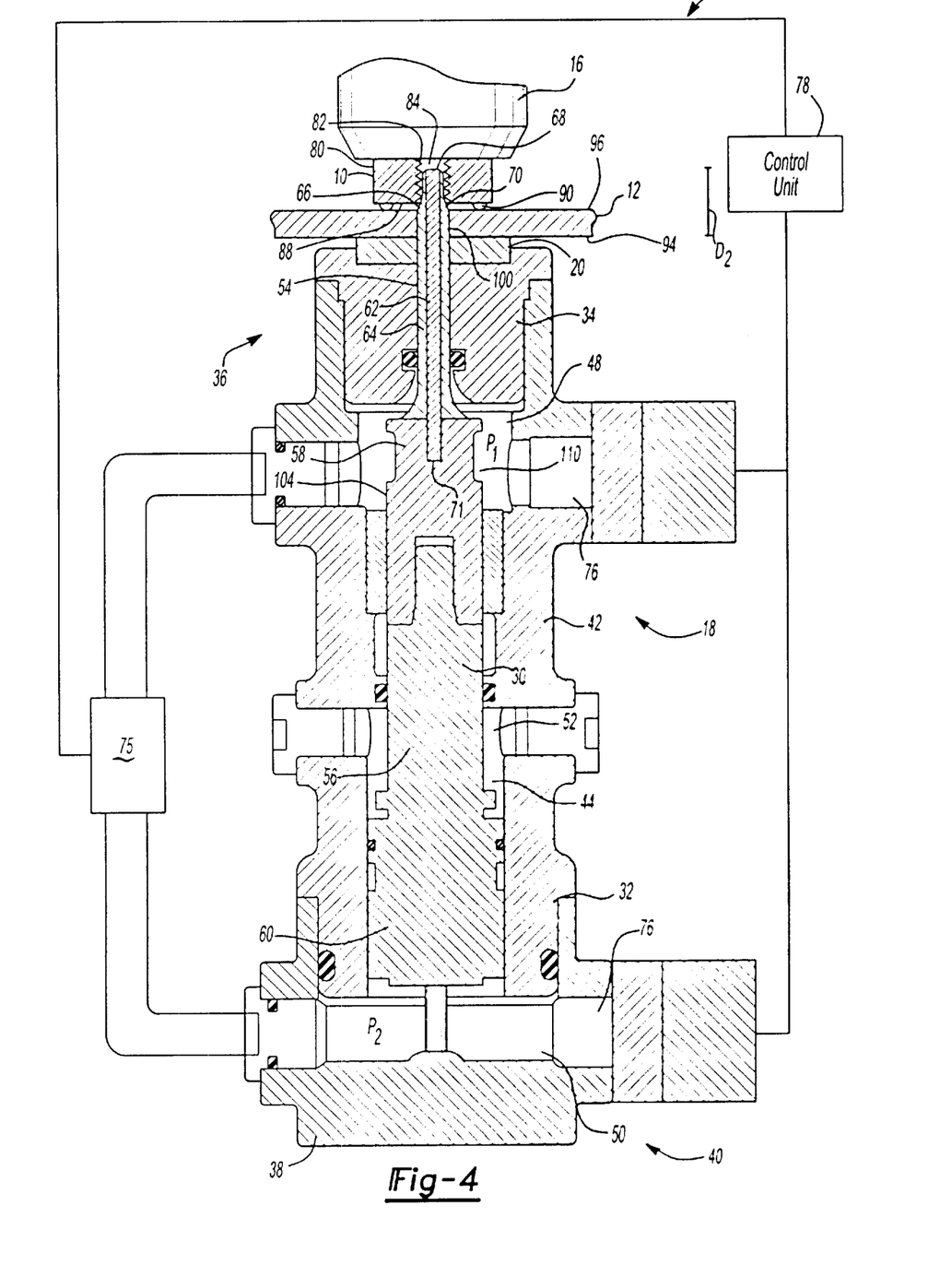
FIGS. 4 and 5 illustrate a sectional view of the portion of the apparatus depicted in FIG. 2 during welding of the fastener to the member.

For welding, the actuator 74 moves the first electrical contact 16 into contact with the nut 10 and the contact 16 applies a force to the nut 10 urging the nut 10 toward the sheet 12. Preferably, the inner annular surface 24 of the contact 16 substantially matingly fits about the outer annular surface 80 of the nut 10. The force applied by the contact 16 overcomes the pressure $P_2$ in the second chamber 50 to translate the pin 62 along with the piston assembly 30 toward the rearward portion 38 of the housing 32 to a third intermediate position, as shown in FIG. 4.

In the intermediate position, the protrusions 90 are brought into abutting contact with the second surface 96 of the sheet 12. The pin 62 is partially retracted into the through-hole 54 of the second electrical contact 20 and the forward portion 34 of the housing 32 such that the pin 62 extends a second distance $D_2$ away from the second electrical contact 20. As shown the second distance $D_2$ is shorter than the first distance $D_1$ in FIG. 3.

Once the piston assembly 30 is in the intermediate position, the power source 72 passes a current between the electrical contacts 16, 20. The current passes through the nut 10, through the protrusions 90 and through the sheet 12. Advantageously, the insulating material 66 of the pin 62 electrically isolates the core 64 of the pin 62 from the nut 10 and the sheet 12 thereby assists in forcing the electrical current to pass through and heat to soften and/or melt the protrusions 90. The voltage producing the current is preferably between about 10.5 to about 36 volt, but may be higher or lower.

Figure 5:
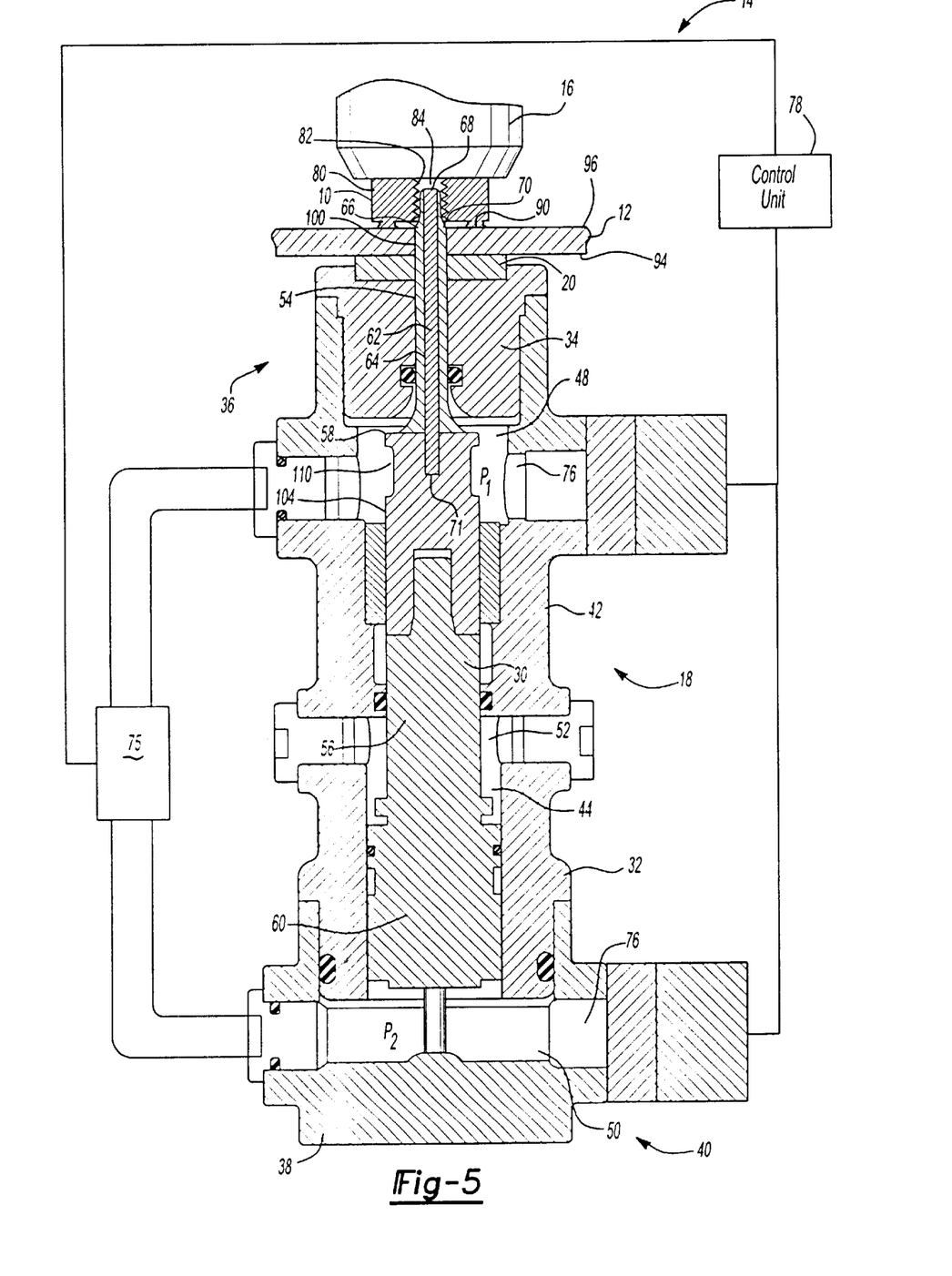

The current elevates the temperature of the protrusions 90 thereby softening the protrusions 90. The heated and softened protrusions 90 are then deformed by and bonded (e.g., metallurgically bonded, welded, solid state welded or the like) to the nut 10 and the sheet 12 by compressing and spreading the softened protrusions 90 between the nut 10 and the sheet 12 as shown in FIG. 5. Preferably, the force compressing the protrusions 90 is provided by the actuator 74 urging the nut 10 toward the sheet 12. The actuator 74 is preferably capable of providing the force (and such force is provided by it) at from about 950 lbs to about 1200 lbs although higher and lower amounts may also be possible.

Prior to passing current through the protrusions 90 as described above, it is preferable for one of the sensors 76 to sense the piston 56 and determine if the piston assembly 30 has been successfully moved to the intermediate position. In the exemplary embodiment of FIG. 4, the switch 76 that is adjacent the first chamber 48 continually senses an outer wall 104 of the piston 56 until the piston assembly 30 is moved to the intermediate position. In the intermediate position, a cavity 110 of the piston 56 aligns with the sensor 76 such that the switch 76 no longer senses the piston 56.

If the switch 76 senses that the actuator 74 has successfully moved the piston assembly 30 to the intermediate position, it typically indicates that the sheet 12 and nut 10 have been properly loaded on the locator assembly 18. In that situation, the switch 76 signals the control unit 78 and the control unit 78 signals the power source 72 to pass current through the protrusions 90 to weld the nut 10 to the sheet 12.

If the switch 76 does not sense that the actuator 74 has successfully moved the piston assembly 30 to the intermediate position (i.e., it has stayed in the extended position), it typically indicates that the sheet 12, the nut 10 or both have been improperly loaded on the locator assembly 18. For example, there may have been failure to load the nut 10 onto the shoulder 70 of the pin 62. In this situation, the switch 76 does not signal the power source 72 to pass current through the protrusions 90 and, preferably, the control unit 78 initiates a signal designed to inform that the nut 10 has not been contacted with the sheet 12.

During welding, the pressure $P_2$ in the second chamber 50 is sufficient for maintaining the shoulder 70 of the pin 62 biased against the nut 10, which, in turn, substantially maintains the piston assembly 30 in the intermediate position. After welding, the actuator 74 retracts the first electrical contact 16 away from the sheet 12 and the nut 10.

Figure 6:
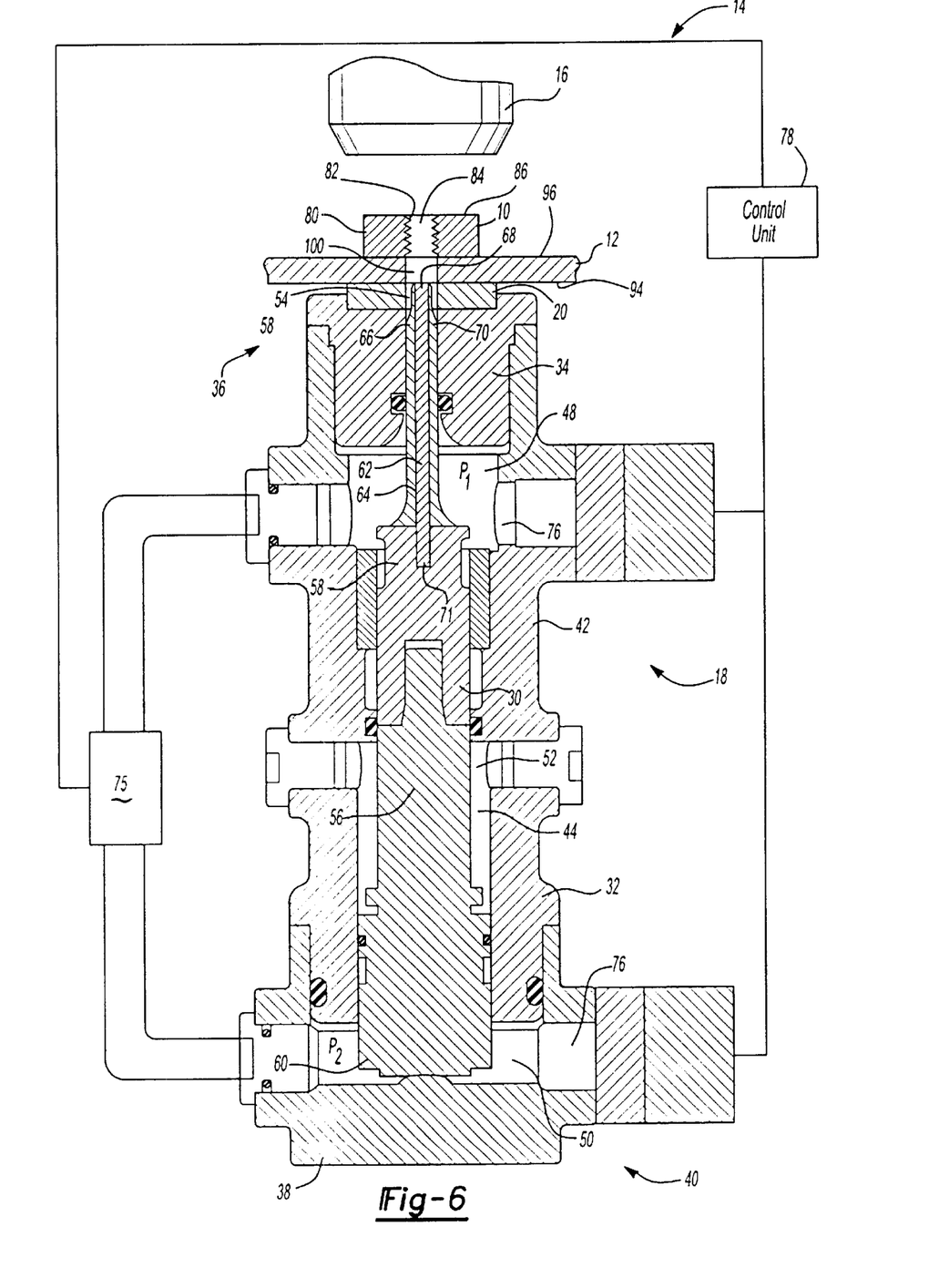
FIG. 6 illustrates a sectional view of the portion of the apparatus depicted in FIG. 2–5 after welding of the nut to the sheet.

If, after retraction of the electrical contact 16, the nut 10 is welded to the sheet 12, the pin 62 remains biased against the nut 10 in the intermediate position. In this situation, the control unit 78 signals the one or more fluid pressure supplies 72 to lower the pressure $P_2$ in the second chamber 50 to below the pressure $P_1$ in the first chamber 48 such that the piston assembly 30 is moved back to the retracted position as shown in FIG. 6.

If the nut 10 is not welded to the sheet 12, the pressure $P_2$ in the second chamber 50 will push the piston assembly 30 and the pin 62 back to the extended position of FIG. 3. In this situation, the sensor 76 senses the wall 104 of the piston 56 and sends a signal to the control unit 78, which, preferably, initiates a signal designed to inform that the nut 10 has not been properly welded to the sheet 12.

In the case of proper welding and upon retraction of the piston assembly 30, the other sensor 76 (e.g., the switch 76 adjacent the rear portion 38 of the housing 32) senses the presence of the piston 56 within the second chamber 50. Upon sensing the piston 56, the sensor 76 signals the control unit 78, which, preferably, initiates a signal designed to inform that the nut 10 has been welded to the sheet 12 and that the sheet 12 and nut 10 combination may be removed from the locator assembly 18. Once the sheet and nut combination is removed, the piston assembly 30 may remain in the retracted position of FIG. 2 to load a new sheet on the locator assembly 18 and repeat the welding process.

Advantageously, by retracting the piston assembly 30 to the retracted position prior to loading the sheet 12 on the locator assembly 18 and prior to removing the sheet 12 and nut 10 combination from the locator assembly 18, the pin 62 is substantially surrounded by the upper portion 34 of the housing 32 and the second electrical contact 20. In this manner, the pin 62 is protected from potential damage, which might otherwise be caused by the loading or removal of the sheet 12 and nut 10 if the pin 62 were extended.

In a highly preferred embodiment of the invention, a standardized set of through-hole sizes (e.g. 2, 3, 4, 5 or more sizes) for the nuts and sheets may be provided such that a standard set of pins corresponding to the through-hole sizes may also be provided. Preferably, the pins of the set are easily interchangeable to and from the locator assembly 18. In the exemplary embodiment of FIGS. 2–4, the upper portion 34 of the housing 32 is threadably attached to the intermediate portion 42 of the housing 32 and the pin 62 is interchanged with another pin by threadably removing the upper portion 34 and pin 62 and replacing them with a second upper portion and pin.

It shall be appreciated that the apparatus and method described above may be used for welding nuts to several different automotive components that have sheet metal or sheet metal portions. Examples include various vehicle panels such as door panels, decklids, hoods, floorboards, floorpans, rear seat back panels, roof panels or the like. It should be further understood that the apparatus and method described above may be used to attach nuts and other fasteners such as a stud or the like to other metal members other than sheets.

It should be understood that the invention is not limited to the exact embodiment or construction that has been illustrated and described, but that various changes may be made without departing from the spirit and the scope of the invention.

What is claimed is:

1. A projection welding apparatus for welding a metal fastener to a metal member, the fastener including a plurality of protrusions, the apparatus comprising:
   (a) a first electrical contact with a cavity for matingly fitting an outer perimeter of the fastener, the cavity being a least partially defined by an inner annular surface of the first contact;
   (b) an outer annular housing having a forward end portion, a rearward end portion and a central annular portion defining an internal opening extending internally along a length of the housing, wherein:
      i) the forward end portion supports a second electrical contact;
      ii) the internal opening includes a first chamber adjacent the forward portion and a second chamber adjacent the rearward portion and an elongated tunnel intermediate the first and second chambers; and
      iii) the forward end portion and the second contact cooperatively define a through-hole of the opening;
   (c) a piston assembly disposed within the opening of the housing, the piston assembly including a piston and a pin wherein;
      i) the piston includes a first forward end adjacent the forward end portion of the housing and a second rearward end adjacent the rearward end portion of the housing;
      ii) the pin includes an inner cylindrical steel core surrounded by an annular insulator, the insulator formed of a ceramic material, the insulator being thinner about the core at a free end of the pin for forming a shoulder thereon
   (d) at least one pressurized fluid source in fluid communication with said first and second chambers for translating the pin and piston assembly between an extended position, an intermediate position and a retracted position;
   (e) a first sensor adjacent to said first chamber and a second sensor adjacent to said second chamber, said first and second switches for monitoring whether the pin and piston assembly are in the extended position, the intermediate position or the retracted position;
   (f) an electrical energy source electrically connected to the first electrical contact and the second electrical contact for passing a current between the contacts and through the plurality of protrusions; and
   (g) a control unit in communication with the sensors, the electrical energy source and the fluid source for determining whether the pin and piston assembly have been successfully moved to the intermediate position for welding and for determining whether the pin and piston assembly have been successfully moved to the retracted position for removal of the fastener and member.

2. A projection welding apparatus as in claim 1 wherein the fastener is a nut.

3. A projection welding apparatus as in claim 2 wherein the metal member is a sheet.

4. A projection welding apparatus as in claim 1 wherein the fastener is a stud.

5. A projection welding apparatus as in claim 4 wherein the metal member is a sheet.

6. A projection welding apparatus as in claim 1 wherein the inner annular surface of the first electrical contact is at least partially formed of a class 11 copper alloy and the second electrical contact is a wafer formed of class 11 copper alloy.

7. A projection welding apparatus as in claim 1 wherein the outer annular housing includes copper.

8. A locator assembly for positioning a fastener and a member for projection welding of the fastener to the member, the assembly comprising:
   (a) a copper outer annular housing having a forward end portion, a rearward end portion and a central annular portion defining an internal opening extending internally along a length of the housing, wherein:
      i) the forward end portion supports a second electrical contact;
      ii) the internal opening includes a first chamber adjacent the forward portion and a second chamber adjacent the rearward portion and an elongated tunnel intermediate the first and second chambers, the first and second chambers adapted for receiving pressurized fluid from at least one fluid source; and
      iii) the forward end portion and the second contact cooperatively define a through-hole of the opening; and
      iv) a first sensor is adjacent to the first chamber, and a second sensor is adjacent to the second chamber;
   (c) a piston assembly disposed within the opening of the housing, the piston assembly including a piston and a pin wherein;
      i) the piston includes a first forward end adjacent the forward end portion of the housing and a second rearward end adjacent the rearward end portion of the housing;
      ii) the pin includes an inner cylindrical steel core surrounded by an annular insulator, the insulator being thinner about the core at a free end of the pin for forming a shoulder thereon.

9. A locator assembly as in claim 8 wherein the fastener is a nut.

10. A locator assembly as in claim 9 wherein the metal member is a sheet.

11. A locator assembly as in claim 8 wherein the fastener is a stud.

12. A locator assembly as in claim 11 wherein the metal member is a sheet.

13. A locator assembly as in claim 8 wherein the inner annular surface of the first electrical contact is at least partially formed of a class 11 copper alloy and the second electrical contact is a wafer formed of class 11 copper alloy.

14. A locator assembly as in claim 8 wherein the outer annular housing includes copper.

15. A method of projection welding a metal fastener to a metal member, comprising the steps of:
  (a) providing a projection welding apparatus having a first electrical contact and a locator assembly, the locator assembly including a piston assembly, at least one sensor and a copper housing, the housing substantially surrounding the piston assembly and supporting a second electrical contact;
  (b) positioning a member upon the locator assembly wherein a first surface of the member abuttingly contacts the second electrical contact and a pin of the piston assembly extends through a through-hole in the member;
  (c) positioning a fastener upon a pin of the piston assembly such that the fastener is spaced away from the member;
  (d) contacting the fastener with the first electrical contact to urge the fastener toward the member such that the piston assembly moves from the extended position to an intermediate position and such that a plurality of protrusions of the fastener contact a second surface of the member;
  (e) welding the fastener to the member by passing a current between the electrical contacts and through the protrusions of the fastener if the at least one sensor senses that the piston assembly has been successfully moved to the intermediate position;
  (f) retracting the first electrical contact; and
  (g) moving the piston assembly to a retracted position and signaling for the removal of the member and fastener if the at least one sensor senses that the piston assembly remains in the intermediate position after retraction of the first electrical contact.

16. A method as in claim 15 wherein the fastener is a nut.

17. A method as in claim 16 wherein the metal member is a sheet.

18. A method as in claim 15 wherein the fastener is a stud.

19. A method as in claim 18 wherein the metal member is a sheet.

20. A method as in claim 15 wherein the inner annular surface of the first electrical contact is at least partially formed of a class 11 copper alloy and the second electrical contact is a wafer formed of class 11 copper alloy.

* * * * *